United States Patent [19]

Kiss

[11] 4,221,556

[45] Sep. 9, 1980

[54] APPARATUS FOR FABRICATING PREFORMED OBJECTS FROM LIGNOCELLULOSE MATTED FIBER FABRICS

[75] Inventor: Gunter H. Kiss, Berlin, Fed. Rep. of Germany

[73] Assignee: K.C.E. Kiss Consulting Engineers, Verfahrenstechnik GmbH, Berlin, Fed. Rep. of Germany

[21] Appl. No.: 925,161

[22] Filed: Jul. 17, 1978

Related U.S. Application Data

[62] Division of Ser. No. 789,632, Apr. 21, 1977, abandoned.

[30] Foreign Application Priority Data

Jan. 12, 1977 [DE] Fed. Rep. of Germany ....... 2701480

[51] Int. Cl.$^{2}$ ............................................ A01J 25/00

[52] U.S. Cl. ................................... 425/182; 425/383; 425/398; 425/412

[58] Field of Search ................. 425/417, 47, 182, 383, 425/389, 398, 405, 412

[56] References Cited

U.S. PATENT DOCUMENTS

| | | | |
|---|---|---|---|
| 1,764,215 | 6/1930 | Kupper | 425/398 |
| 3,795,471 | 3/1974 | Milani | 425/405 R |

*Primary Examiner*—Donald J. Arnold
*Assistant Examiner*—James R. Hall
*Attorney, Agent, or Firm*—Weingarten, Maxham & Schurgin

[57] ABSTRACT

Apparatus for producing preformed objects or parts from lignocellulose matted fiber fabrics. The apparatus produces the objects in stepwise fashion by tools whose forming surfaces are covered by an elastically deformable intermediate layer. The intermediate layer may be fixed to the tool or alternatively it may be an endless belt or tape which covers the tool forming surfaces.

11 Claims, 4 Drawing Figures

APPARATUS FOR FABRICATING PREFORMED OBJECTS FROM LIGNOCELLULOSE MATTED FIBER FABRICS

This is a division, of application Ser. No. 789,632, filed Apr. 21, 1977 now abandoned.

FIELD OF THE INVENTION

The invention is directed toward apparatus for fabricating preformed objects of lignocellulose matted fiber fabrics.

DISCUSSION OF THE PRIOR ART

It is known from practical experience that a soft mat can be produced from a lignocellulose matted fiber fabric by steaming it. Such a fabric has been precompressed for storage and transport purposes. The resulting soft mat can be shaped into formed parts, under pressure and temperature. With strong deformation zones, however, the danger always exists that this mat will be bunched or pulled in these zones. Because of shearing forces which may occur, the mat may then tear, and consequently become useless for further processing.

It is furthermore known that damage to the fiber mat during the production of preformed objects can be counteracted in a process for step-wise deformation. This is accomplished by the use of a preforming tool consisting of several component surfaces which can move with respect to one another. The surfaces are moved into their end position in temporal sequence with respect to one another, so that the desired deformation of the mat is effected in a straight sequence. At places of severe deformation, the mat can here also be pulled elastically.

This known process exhibits a series of disadvantages:

1. The component dies on the tool have a relative motion that is locally relatively large. This leads to locally large stretch and shear forces in the fiber mat. This reduces the possibility for shaping the mat, since it tears at locations of more severe shear stress.

2. The fiber mat contacts the metallic surface of the preforming tool. Consequently, when the tool is cold, the mat surface is cooled. The thermoplastic binding agent of the mat consequently undergoes a sever loss of viscosity in this area. This factor likewise reduces the formability of the mat. On the other hand, if the preforming tool is heated, the binding force of the binding agent is not fully utilized during fabrication of the preformed object. After being preformed, the mat springs back elastically. Consequently, the desired precompression of the preformed object is impaired particularly at those locations which experienced the greatest stress during the fabrication pressing.

3. The gaps along the joint between the mutually movable component dies of the preforming tool come into direct contact with the fiber mat, and are polluted by fibers and by binding agents. The tools consequently become liable to failure during operation. This liability requires great expenditure for maintenance work and reduces the economy of the process.

SUMMARY OF THE INVENTION

It is the purpose of the invention to improve the fabrication of preformed objects from flat lignocellulose fiber mats. This process involves a step-wise deformation with the aid of tools whose forming surfaces consist of several, mutually movable component surfaces. It accomplishes its task by homogenizing the forces acting on the matted fiber fabric during deformation, by creating favorable thermal conditions in the preforming tool, and by increasing the operating reliability of the tools.

According to the invention, these results are effected by the form-producing, mutually movable component surfaces of at least one half of the tool acting jointly on at least one elastically deformable intermediate layer, and by the deformation forces being transmitted through this intermediate layer to the matted fiber fabric.

BRIEF DESCRIPTION OF THE DRAWING

The objects, advantages and features of the invention will be readily appreciated from the following detailed description when read in conjunction with the accompanying drawing in which.

DESCRIPTION OF THE PREFERRED EMBODIMENTS

Figure 1:
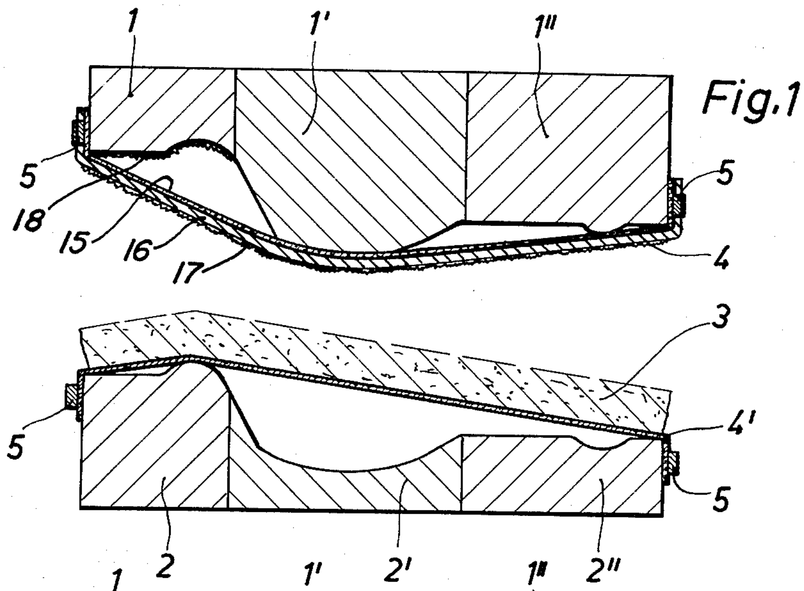
FIGS. 1-3 schematically show the steps of the inventive process being performed by the invention apparatus.

The elastic intermediate layer performs several functions which are advantageous in performing the improved process of the invention:

1. The elastic stretching of the intermediate layer distributes the locally delimited relative motions of the component dies over larger surface areas whereby local stretch differences are reduced and homogenized. Reduced tensile and shear stresses are therefore transmitted to the fiber mat. In addition, it thereby becomes possible to pull the mat from larger areas at locations of strong deformation.

2. The heat conductivity of the elastic intermediate layer is quite low. Consequently, during the short time when the preforming tool is closed, the layer insulates the surface of the mat, which has been heated by steaming, from the metal components of the tool. On the other hand, the thickness of the intermediate layer is relativey small (preferably 0.1–0.5 mm). Consequently, despite is limited heat conductivity, it permits the preformed object to cool sufficiently over the duration of the entire pressing time, which time is substantially larger than the actual time during which the tool is closed. Another favorable effect on the entire course of the temperature is that when the tool closes, the intermediate layer predominantly contacts only the component die of the tool which has just been moved into its end position. No heat flow into the tool therefore takes place from the areas of the mat that have not yet been deformed. Consequently, the deformability of the mat is not impaired in these areas. The intermediate layer, in accord with the invention, therefore makes it possible to work with cooled tools. The deformability of the steamed fiber mat is fully maintained. At the same time, it is, on the one hand, thereby possible to shorten the total pressing time and, on the other hand, the preformed object can leave the preforming tool with an altogether lower temperature than with other procedures. The binding force of the thermoplastic binding agent can therefore be better utilized for local precompression in the preformed object and for the desired form stability.

3. The encompassing elastically deformable intermediate layer separates the movable joints between the movable component dies of the tool from the fiber mat during pressing. Pollution of these areas of the tool is thereby prevented. This feature ensures the functional capability of the deforming tool even under conditions of assembly line production.

4. Because the elastic intermediate layer springs back when the tool is opened after pressing, the preformed object is automatically separated from the preforming tool. Consequently, special auxiliary equipment for ejecting the preformed object can be dispensed with. This is especially true since the elastic materials of the intermediate layer as a rule have, at any rate, only a small tendency to adhere to the binding agent of matted fiber fabric, and consequently have the characteristics of a separation layer.

The equipment for performing the process according to the invention can be advantageously designed in many ways.

For example, it is possible to stretch the intermediate layer according to the invention over the respective path of the tool, in the form of a film or a sheet, and to fasten it on the tool frame, either continuously or point by point. Since the intermediate layer is subject to wear (and must be cleaned), quick fastening by connecting strips and/or snap-on buttons is suitable.

A particularly advantageous device for performing the process according to the invention is one in which the elastic intermediate layer is brought over the tool as an endless tape. After every working cycle the intermediate layer tape is moved further in such a way that a new region of intermediate layer becomes effective during the next cycle. In addition to reduced wear of the intermediate layer, this makes it possible to design the device also in such a fashion that the intermediate layer can be continuously cleaned outside the tool without interrupting production. Instead of an endless tape, rolled-up intermediate layers can also be used, located on reels at both sides of the tool.

When the intermediate layer is applied in the form of rolls or endless tapes, these can themselves be used as transport belts for the fiber mat blanks and for the preformed object itself. Combined with suitable steaming devices and transport means, which are in themselves well known, the devices according to the invention therefore make possible an automatic total production run.

While the tool is closed, the stretching motion of the elastic intermediate layer is transmitted to the fiber mat. It is transmitted by means of a friction contact between the intermediate layer and the fiber mat. Depending on the formation task involved it may be favorable, according to the invention, to influence the friction between the mat and intermediate layer in a specifically targeted fashion, for example by roughening the intermediate layer on the side where it contacts the mat, or by giving it a surface structure which can, for example, have the form of nubs. This influence on the friction can here extend over the entire area of formation, or it can also be made locally limited.

When the tool closes, the stretch distribution in the intermediate layer also depends on the friction between the component dies and the intermediate layer. By roughening the component surfaces of the individual dies of the tool, according to the invention, the stretching distribution in the intermediate layer can therefore be influenced. In this way, the conditions under which the fiber mat is formed can be optimized.

With the apparatus formed according to the invention, it can be advantageous to design the elastically deformable intermediate layer in such a fashion that it consists of an elastic base layer and an elastic abrasion layer. Here, the abrasion layer preferably is less thick than the base layer. As a rule, the abrasion layer consists of a more economical material, and is replaced after a shorter use time.

All such as materials, preferably elastic rubber material, can be considered as materials for the intermediate layer. Such materials must be able to be fabricated in sheet form or mat form. Elastic fabrics are likewise suitable, especially when the intermediate layer consists of a base layer and an abrasion layer, It is then advantageous for the base layer to consist of an elastic fabric, whose meshes are protected against penetrating impurities by a sheet-like abrasion layer.

Figure 2:
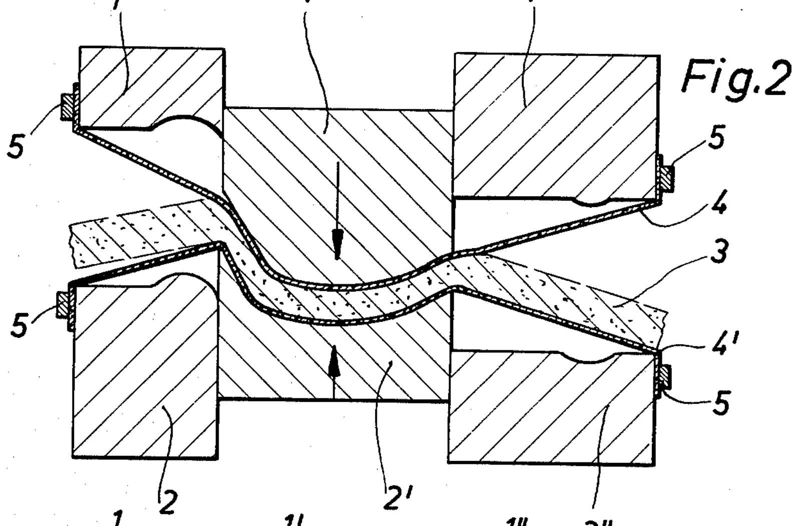
Figure 3:
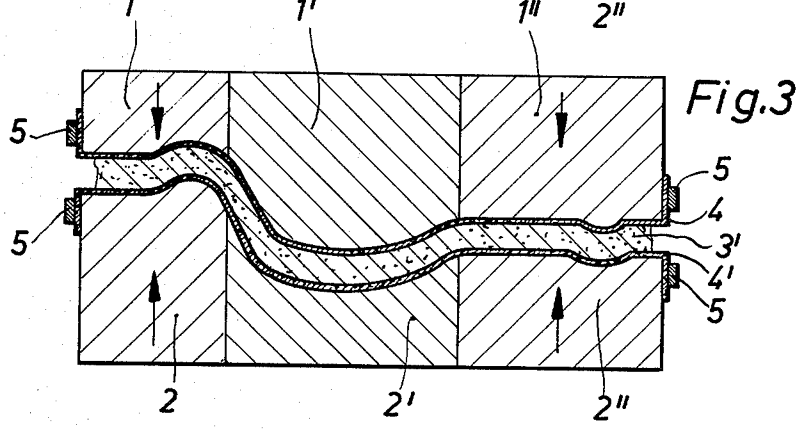

With reference now to the drawing, and more particularly to FIGS. 1–3 thereof, the forming surface of the upper tool consists of three component dies 1, 1' and 1''. That of the lower tool consists of the corresponding component dies 2, 2', and 2''. The elastic intermediate layer 4 and 4' respectively is stretched over the forming surfaces of the respective halves of the tool. It is fastened to the tool by means of the fastening members 5 which may be any suitable means.

FIG. 1 shows the tool in its opened position. The steamed mat blank 3 is laid down on the intermediate layer 4' of the lower half of the tool.

FIG. 2 depicts how the fabrication of the preformed part begins. The component dies 1' and 2' have respectively been moved in the direction of the arrows into their final position. This can be done simultaneously or sequentially.

FIG. 3 shows the final position of the tool. The component dies 1, 1'', and 2, 2'' have also been brought into their end or closed position, along the direction of the arrows, according to the preprogrammed motion of tool segments. The preformed part 3' has now been completely formed.

It may easily be seen from FIGS. 1–3 that the elastic intermediate layers 4 and 4' respectively, geometrically separate the steamed mat blank 3 from the component dies (1, 1'' and 2, 2'' in FIG. 2) in all areas which have not yet been included in the formation process. The outflow of heat from the mat is thereby prevented in these zones.

The alternative embodiments discussed hereinabove are depicted in FIG. 1. Intermediate layer 4 is shown as being comprised of two layers, elastic base layer 15 and elastic abrasion layer 16 with abrasive or roughened surface 17. As an example of a roughened surface of a die, die 1 is shown with roughened forming surface 18. It should be understood that the surface of a unitary layer 4 may also be roughened, either entirely or partially. Also layer 4' may be roughened in addition to or instead of layer 4.

Figure 4:
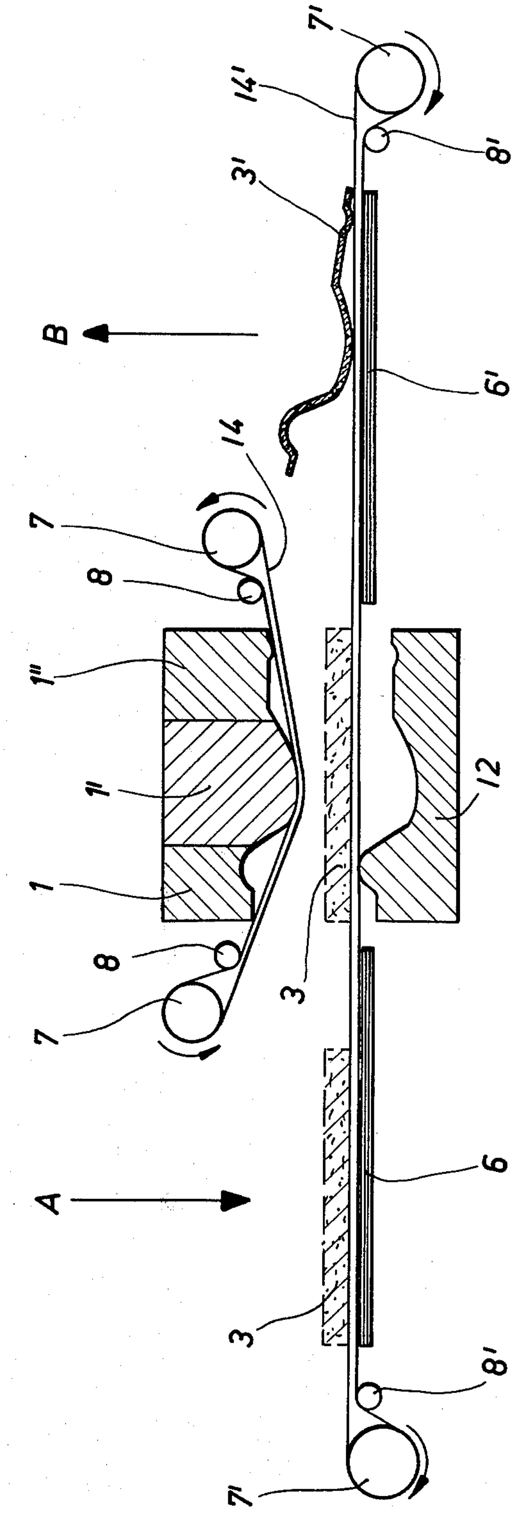
FIG. 4 schematically shows an alternative embodiment of the invention.

In FIG. 4, the forming tool consists of the undivided lower tool 12, and of the upper tool which is divided into component dies 1, 1', and 1''. The elastic intermediate layer 14 of the upper tool has been designed as an endless tape. It is led about the driving rollers 7 and the guide rollers 8 in such a fashion that the forming surface of the upper tool is spanned across its width, that is, from the left side to the right side of the forming surfaces as seen in the drawing figures. At least one of the driving rollers 7 is provided with a driving device (not shown), which can be operated when the tool is opened, and which turns the driving rollers 7 in the direction of the arrows. The endless tape 14 can be designed to connect permanently with the driving and guiding rollers 7 and 8 respectively. It can be designed as a constructional unit, for example by a frame construction. As such it can execute a separate stroke motion or, under appropriate circumstances, it can be moved together with the component dies 1 and 1''.

The elastic intermediate layer 14' of the lower tool 2 is likewise designed as an endless tape. It has been extended and has been brought over the supporting surfaces 6 and 6'. The drive is effected as with the upper tool, through the driving and guiding rollers 7' and 8' respectively. The lower tool 12, the supporting surfaces 6 and 6', as well as the tape drive 7' and 8' respectively are all fixed in location.

FIG. 4 shows the tool in its open position. At A, the mat blank 3 is inserted by appropriate means after having been steamed. The intermediate layer tape 14' is moved forward by means of driving rollers 7' in such a fashion that the mat blank 3 is transported into the forming position between the tool halves as shown in the drawing. At the same time, the preformed part 3', which has been fabricated in the previous working cycle, is here taken along into the position free of the tool. By means of a suitable transfer device, it can be withdrawn at B and brought to the fabricating press.

The fabrication phase shown in FIG. 4 corresponds to that in FIG. 1. The actual fabrication on the preformed part then runs analogously to the steps of FIGS. 2 and 3. It should be observed that although the tools shown in the drawing have three segments, any practical number of segments may be employed.

In view of the drawing and description herein it is likely that modifications and improvements will occur to those skilled in the art which are within the scope of this invention.

What is claimed is:

1. An apparatus for forming objects from lignocellulose matted fiber fabric blanks, said apparatus comprising:

a tool comprising:

a first tool half having a first forming surface thereon; and a second tool half having a second forming surface thereon, said first forming surface being formed to mate with said second forming surface, said tool halves being adapted to assume an open spaced apart position and a closed closely confronting adjacent position, at least one of said tool halves being formed of a plurality of components dividing its forming surface into a like plurality of components, said components being movable in a parallel manner with respect to one another, toward and away from the other of said tool halves; and an elastically deformable first intermediate layer covering at least one of said first and second forming surfaces and being positioned between said one forming surface and a blank when an object is formed from the blank by moving said tool halves to the closed position with a blank positioned therebetween.

2. The apparatus recited in claim 1 wherein said first intermediate layer is positioned adjacent one of said first and second forming surfaces.

3. The apparatus recited in claim 2 and further comprising an elastically deformable second intermediate layer covering the other one of said first and second forming surfaces.

4. The apparatus recited in claim 1 wherein said first intermediate layer is in the form of a tape transversely intermittently movable with respect to said forming surfaces through predetermined distances.

5. The apparatus recited in claim 4 wherein said predetermined distance substantially equals the width of said forming surfaces, the width being the forming surface dimension in the direction of movement of said tape.

6. The apparatus recited in claim 4 wherein said tape is endless;

said apparatus further comprising roller means on either side of said tool over which said tape moves.

7. The apparatus recited in claim 4 wherein said tape extends beyond either side of said tool by a distance at least equal to said forming surface width, wherein the forming surface width is the forming surface dimension in the direction of movement of said tape, said tape extending beyond one side of said tool, that first extending portion being adapted to hold one of said blanks, and said tape extending beyond the other side of said tool, that second extending portion being adapted to hold one of said preformed objects.

8. The apparatus recited in claim 3 wherein said first and second intermediate layers are each formed as a tape transversely intermittently movable with respect to said forming surfaces through predetermined distances.

9. The apparatus recited in claim 1 wherein the side of said first intermediate layer adapted to contact said blank has a roughened surface.

10. The apparatus recited in claim 2 wherein at least a portion of said forming surface adjacent said first intermediate layer is roughened.

11. The apparatus recited in claim 1 wherein said first intermediate layer comprises a base layer and an abrasive layer.

* * * * *